United States Patent [19]

Juncosa Lopez

[11] Patent Number: 4,841,791
[45] Date of Patent: Jun. 27, 1989

[54] SPEED GEARBOXES

[76] Inventor: Jose Juncosa Lopez, Po de la Habena, 80, Madrid, Spain

[21] Appl. No.: 58,353

[22] Filed: Jun. 4, 1987

[30] Foreign Application Priority Data

Sep. 18, 1986 [ES] Spain .................................. 8601989

[51] Int. Cl.⁴ .............................................. F16H 15/16
[52] U.S. Cl. ........................................ 74/190; 74/191; 74/192
[58] Field of Search .................. 74/191, 190, 192, 193

[56] References Cited

U.S. PATENT DOCUMENTS

| | | | |
|---|---|---|---|
| 1,146,982 | 7/1915 | Weiss | 74/193 |
| 1,207,216 | 12/1916 | Roberts | 74/193 |
| 1,452,946 | 4/1923 | Weiss | 74/190 |
| 2,209,023 | 7/1940 | Jett | 74/191 |
| 3,224,285 | 12/1965 | Maichen | 74/192 |
| 4,448,087 | 5/1984 | Barzel | 74/193 |
| 4,646,581 | 3/1987 | Bondurant | 74/193 |

FOREIGN PATENT DOCUMENTS

| | | | |
|---|---|---|---|
| 2354409 | 9/1974 | Fed. Rep. of Germany | 74/192 |
| 2354410 | 9/1974 | Fed. Rep. of Germany | 74/191 |
| 859023 | 12/1940 | France | 74/192 |
| 6272 | of 1898 | United Kingdom | 74/190 |
| 343225 | 2/1931 | United Kingdom | 74/190 |

Primary Examiner—Leslie A. Braun
Assistant Examiner—Scott Anchell
Attorney, Agent, or Firm—Michael J. Striker

[57] ABSTRACT

A gearbox with a driving shaft connected to a cone which is opposed to a second cone and is parallel thereto. An actuating mechanism of both cones includes a rolling axial crown, and a plurality of rollers of a curve-concave generatrix, mounted on a common support. The rollers are mounted with a freedom of rotation on their own axles, which sufficiently facilitates the axial movement of the crown with regard to the couple of contrapositioned cones, while at the same time they are coated with a material having a high coefficient of friction, to ensure the dragging of the crown through a part of the actuating cone and the dragging of the cone driven by a part of the crown.

5 Claims, 6 Drawing Sheets

SPEED GEARBOXES

BACKGROUND OF THE INVENTION

The present invention relates to a speed gearbox used, for instance in automobile vehicles and particularly those in which the transmission between the actuating axle and the driven axle increases in a lineal mode and uninterruptedly.

It is an object of this invention to ease handling of the gearbox and to ease mounting for same.

As it is well known, the gearboxes for automobiles and similar objects, have the purpose of establishing at all times the most ideal relationship between the impulsive force of the motor and the sped of advancement of the vehicle, in a way that in "short" speeds and for a certain power of the motor, the torque supplied to the driving wheels is great and the speed of advancement, small, and vice-versa.

As it is also well known, presently, the majority of gearboxes for vehicles have four or five speeds, besides the unavoidable "back motion", the values of which are generally around $\frac{1}{4}$ W, $\frac{1}{2}$ W, $\frac{3}{4}$ W, W and 5/4 W, wherein W the speed of rotation of the driving shaft. These speeds imply, respectively, the existence of torques at the tractor shaft with a 4p, 1p, 4/3p, p and 4/5p value, wherein p is the motor torque.

The change of any speed to the immediate former or latter one, assumes a sudden jump which is dampened due to the use of the classical clutch.

Although this solution is of the mostly generalized use, there are other gearing mechanisms in which there is no "jump" when changing from one speed to the immediate one, which change is produced continually, consequently making the clutch unnecessary.

Within this type of gears, called friction gears, there exists a group which is based on the use of two contrapositioned cones, with the same conical semi-angle and with parallel shafts.

The basic idea of this type of friction gears is known for a very long time and is schematically represented in FIG. 1, where the cited cones are referenced with 1 and 2, and their respective shafts with 3 and 4.

The shaft of one of these cones is coupled to the motor and the other to the differential of the vehicle. The transmission of the movement from one cone to the other is carried out with the cooperation of an intermediate wheel 5, the axle 6 of which is coplanary, regarding shafts 3 and 4 and parallel to each locus of points 7 and 8 at which contact of the wheel 5 is made with said cones 1 and 2. The cones are only capable to rotate on their respective shafts 3 and 4, whilst the wheel 5, besides rotating, is capable to perform axial movements.

The rotation of the actuating cone 1 is transmitted to the tractor 2 due to a great friction arising between the wheel 5 and both cones, as the cones press strongly between the locus of points 7 and 8 at which contact is made. It has to be added that the materials of which the cones and wheels are made, provide a high friction coefficient.

As can be understood from FIG. 1, for a rotation speed $W_1$ of the actuating cone 1, the corresponding speed of the tractor cone 2 will depend on the position of the wheel 5, and its value will be $W_2 = W_1 R_1 / R_2$, which value, to change the speed, may be varied by moving at will the wheel 5 along its axle 6, with which will vary the values $R_1$ and $R_2$ and therefore, the value $W_2$, and all of it in a lineal mode.

This solution, apparently ideal, is in practice most inconvenient, because to move axially the wheel 5 it is necessary to apply a great effort to overcome the friction which keeps the cones and the wheel tightly linked. Such a mechanism has hardly been utilized for this reason.

SUMMARY OF THE INVENTION

It is an object of the present invention to provide an improved speed gearbox.

The improvements of the invention based on the use of the two contrapositioned cones reside in allowing a comfortable manipulation of the gear, with a minimum effort to vary the transmission.

The classical drive wheel between the cones is substituted for a "circular crown" which houses both cones, instead of same being situated between them. This crown is constituted by a plurality of rollers, obviously of a curve-concave generatrix, provided with a freedom of rotation on their own axles, so that said rollers transmit the movement from one cone to the other. Inasmuch as their shafts remain included in an imaginary plane, perpendicular to the locus of points at which contact occurs between the transmission crown and the cones, the whole of the crown can axially move easily that is, the crown moves axially in the sense of the cited locus of points of contact with the cones when freely rotating on their own shaft, with a practical absence of friction.

The crown is formed as a circular framework. A plurality of plates, which constitute the means of fixation for the ends of the axles of the rollers, are radially inside of the framework and fixed thereto. Each roller has a rigid core and a cover or housing that is formed as an elastic sleeve. The sleeve is elastic in order to provide the grasping between such rollers and the cones during rotation of the crown and consequent transmission of movement between cones.

In accordance with another characteristic of the invention, the cited actuation cones are mounted on a chassis at only one end of their axles, that is, that the cones are overhanging and each of them is extended through by a shaft. This fixed shaft is mounted on the chassis of the gear by corresponding bearings, and is riveted, on its free end and opposite to the cone, in a corresponding conical pinion. This structure allows for an easy mounting of the crown on the cones and a full freedom of movement for the same and for the elements supporting it.

In accordance with another characteristic of the invention, the transmission crown is formed as a cage, which must be rotating, like the crown itself, with the edge of the imaginary base of the cage, which embraces the cones. At the other base of the cage is placed a plate with a central hole, where a bearing is placed. A sleeve, mounted on a rail of a quadrangular section is connected to the framework of the gear. An actuation bar, which extends to the outside is riveted in the knob or drive of actuation, so that the actuation on said knob will provoke an axial movement of the cage, with the corresponding movement of the crown of transmission, along the operative locus of points of contact with the contrapositioned cones.

At the cage can be housed any known speed regulating mechanism, to make the change of gears automatic.

The coupling between the outlet shaft of the driven cone and the second shaft of transmission of movement to the differential of the vehicle is made with the cooperation of a sleeve coupled to this second shaft, and provided with two conical contrapositioned pinions. Such a sleeve is movable along the differential shaft and is located between two contrapositioned pinions, the conical pinion associated to the axle of the outlet of the driven cone.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRENT EMBODIMENT OF THE INVENTION

Figure 1:
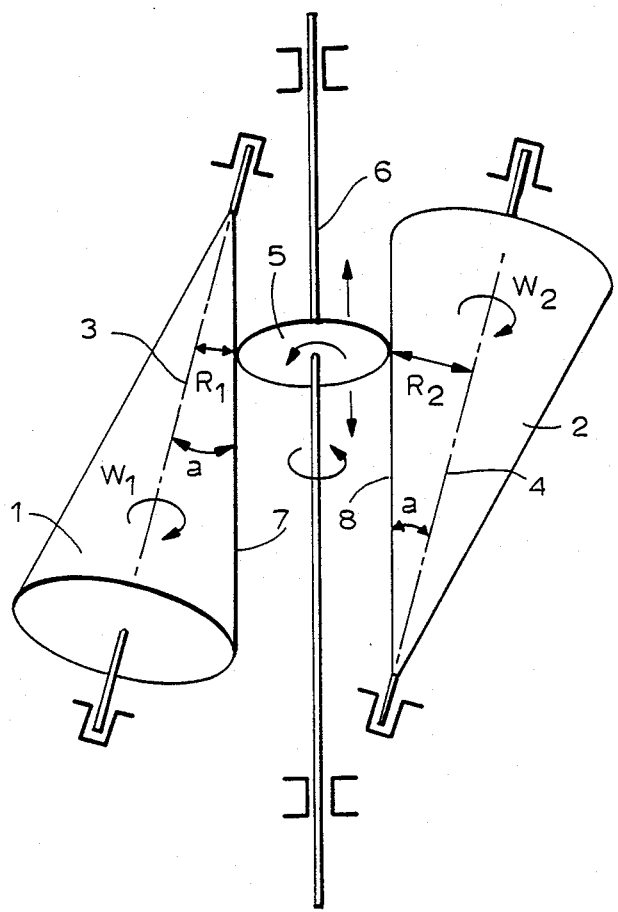
FIG. 1 is a schematic representation of a conventional friction gear with two contrapositioned cones.
Figure 2:
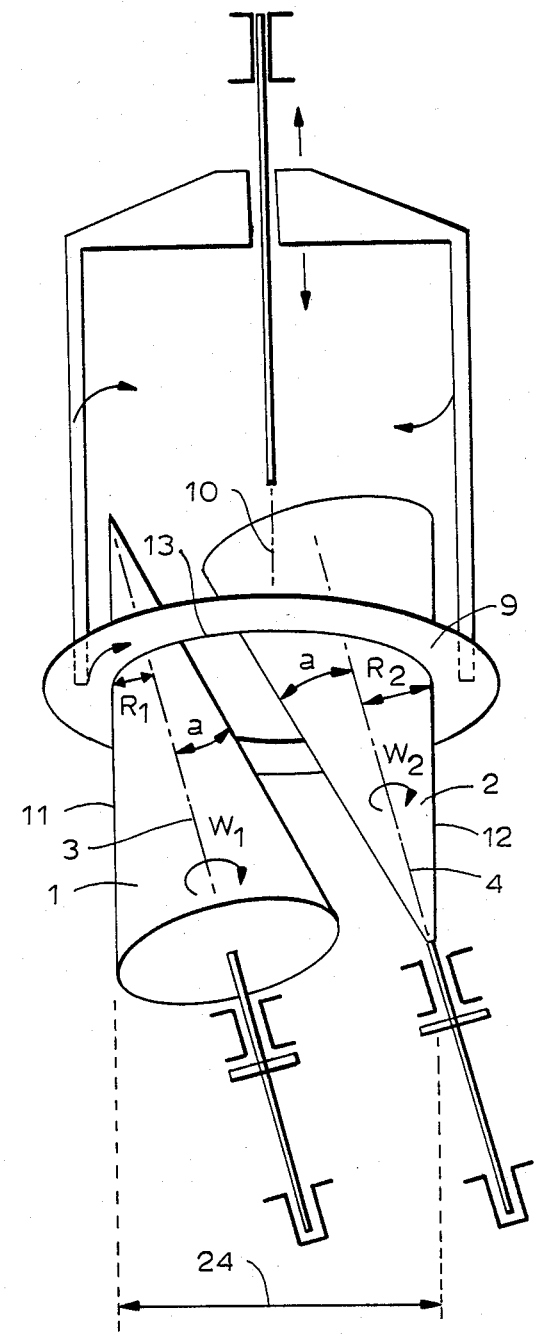
FIG. 2 is a schematic representation similar to that of FIG. 1, but showing a speed gearbox in accordance with the present invention.

Referring now to the drawings in detail, and firstly to FIG. 2, it can be seen that a gearbox includes a couple of contrapositioned cones 1 and 2, with the same conical (a) semi-angle, and shafts 3 and 4 parallel to each other. A wheel 5 is substituted by a circular crown 9, which has a shaft of rotation 10 which is coplanar with the shafts 3 and 4 and is parallel to the peripheries 11 and 12 so that it maintains the contact of said crown with cones 1 and 2, to which it embraces tightly, that is, through the locus of points of contact at all times.

The crown 9, besides being able to rotate around its shaft 10, will be able to move, without friction, along it, as its internal circumference 13 will be integrated by arches 14 (FIG. 3) which determine the generatrix of some rollers 15, of revolution, generated when arches 14 rotate around the geometrical axes 16. These rollers 15 will be able to rotate around their mechanical cylindrical shafts 17 shown in FIG. 4. The shafts are fastened to a circular framework 18 by means of the plates 19 and 20 and screws 21.

Figure 3:
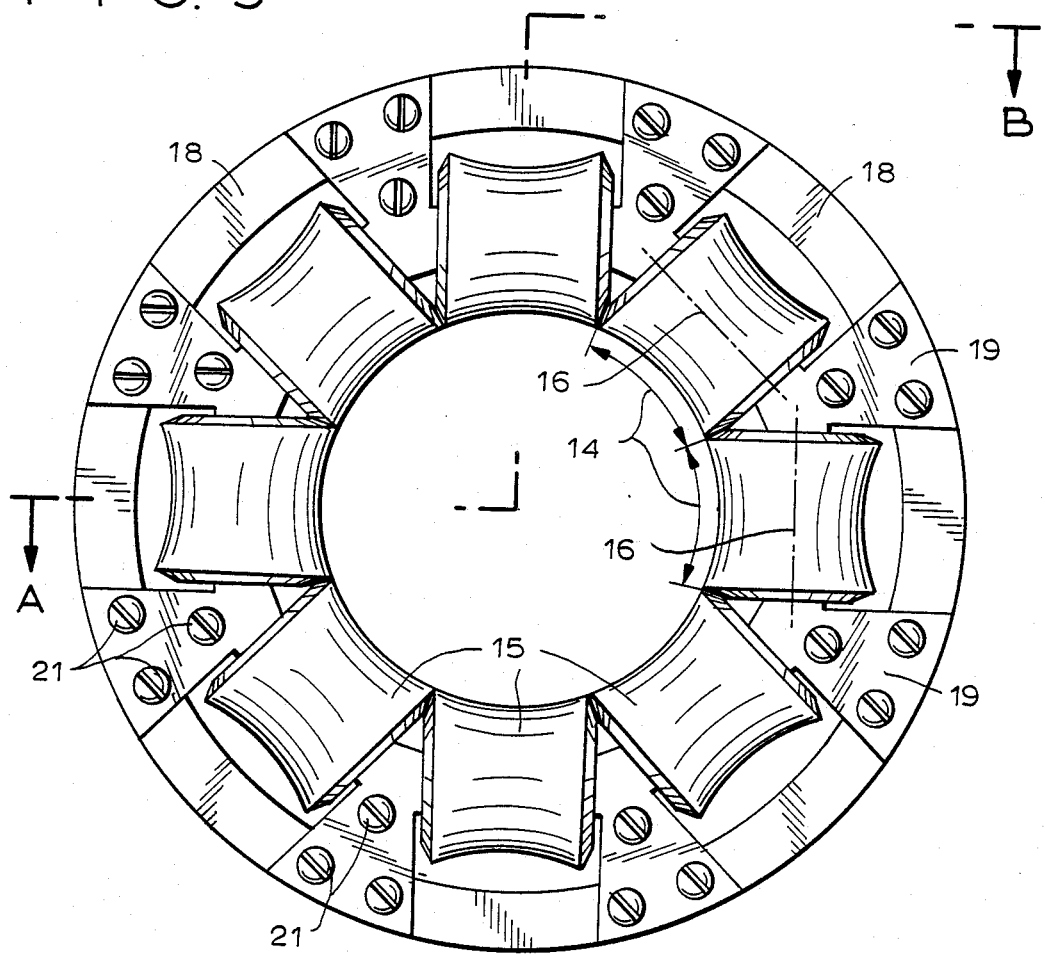
FIG. 3 is a plane view of the transmission crown provided between the contrapositioned cones according to the invention.
Figure 4:
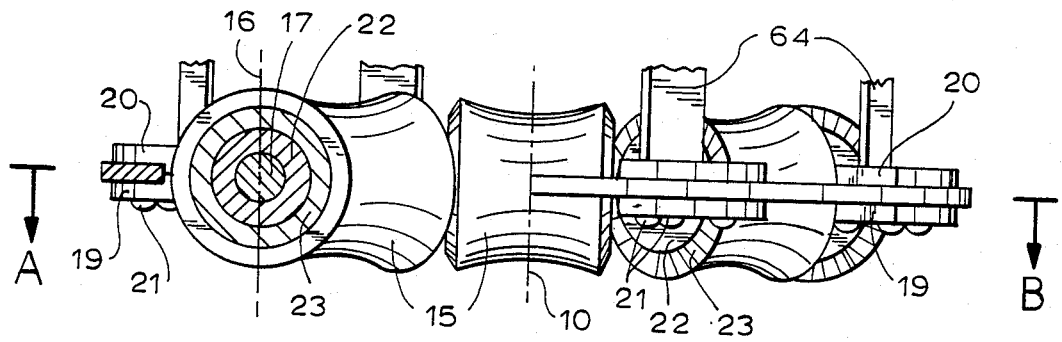
FIG. 4 illustrates a sectional profile of the same crown taken along line A-B of FIG. 3.
Figure 5:
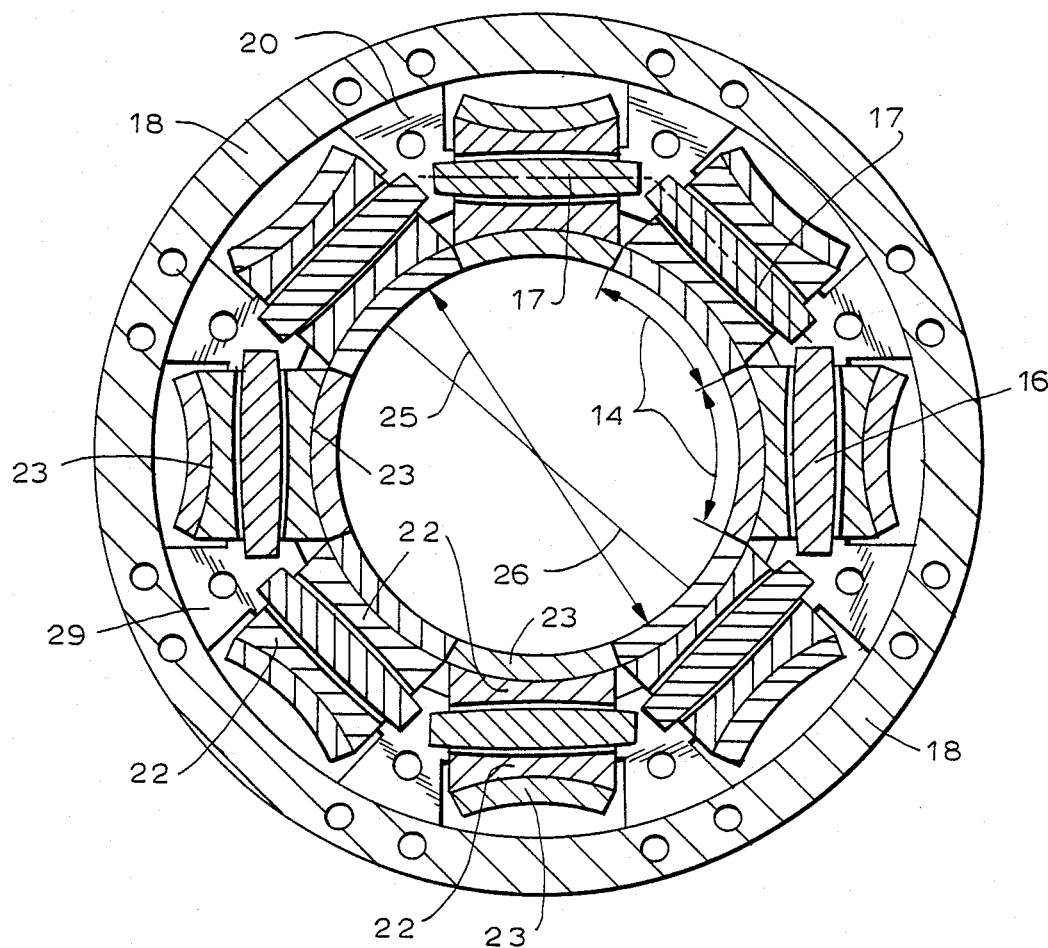
FIG. 5 is a plane view of the crown, similar to that of FIG. 3, but sectioned at its intermediate plane.

In FIGS. 3, 4 and 5, an embodiment is shown of the transmission crown 9, which is non limitative, as other forms of framework, fastening of the rollers to the same, varying the number of said rollers, etc., may be adopted, without it affecting the essence of the invention.

Evidently, the translation of the crown 9 along its axle 10, is made without any friction at all, as the rollers 15 will roll over and along the generatrices 11 and 12 at which contact is made between the crown 9 and the cones 1, 2.

Each roller is made, as also observed in FIGS. 3 to 5, of a solid core 22, the surface of revolution of which is covered with a sleeve 23 of a very elastic material, like, for instance, rubber.

The rollers, which are in contact with the generatrices 11 and 12, must always exert a considerable pressure on the locus of points, determining a high coefficient of friction. The pressure is attained by duly dimensioning the crown, so that the distance 24 between the generatrices 11 and 12 (see FIG. 2) is larger than diameter 25 and somewhat smaller than the diameter 26 (see FIG. 5). The high coefficient of friction is subject to election of materials of the construction and to providing the rolling surfaces of the cones with a great rugosity.

The operation of this mechanism is as follows: once the motor cone 1 is put into rotation, due to the great adherence with the crown 9, it causes the latter to rotate around its axle 10, which in turn, forces the tractor or driven cone 2 to rotate, with a speed which depends on the position of the crown, which $W_2$ value, according to the speed variation $W_1$ of the motor cone 1 will be:

$$W_2 = W_1 R_1 / R_2.$$

To change the speed, it will be sufficient to move the crown to another position, over the generatrices 11 and 12, which as previously said, is made by "rolling" of the rollers over such generatrix. This "rolling" is essentially frictionless so that changing speed is effected easily.

Figure 7:
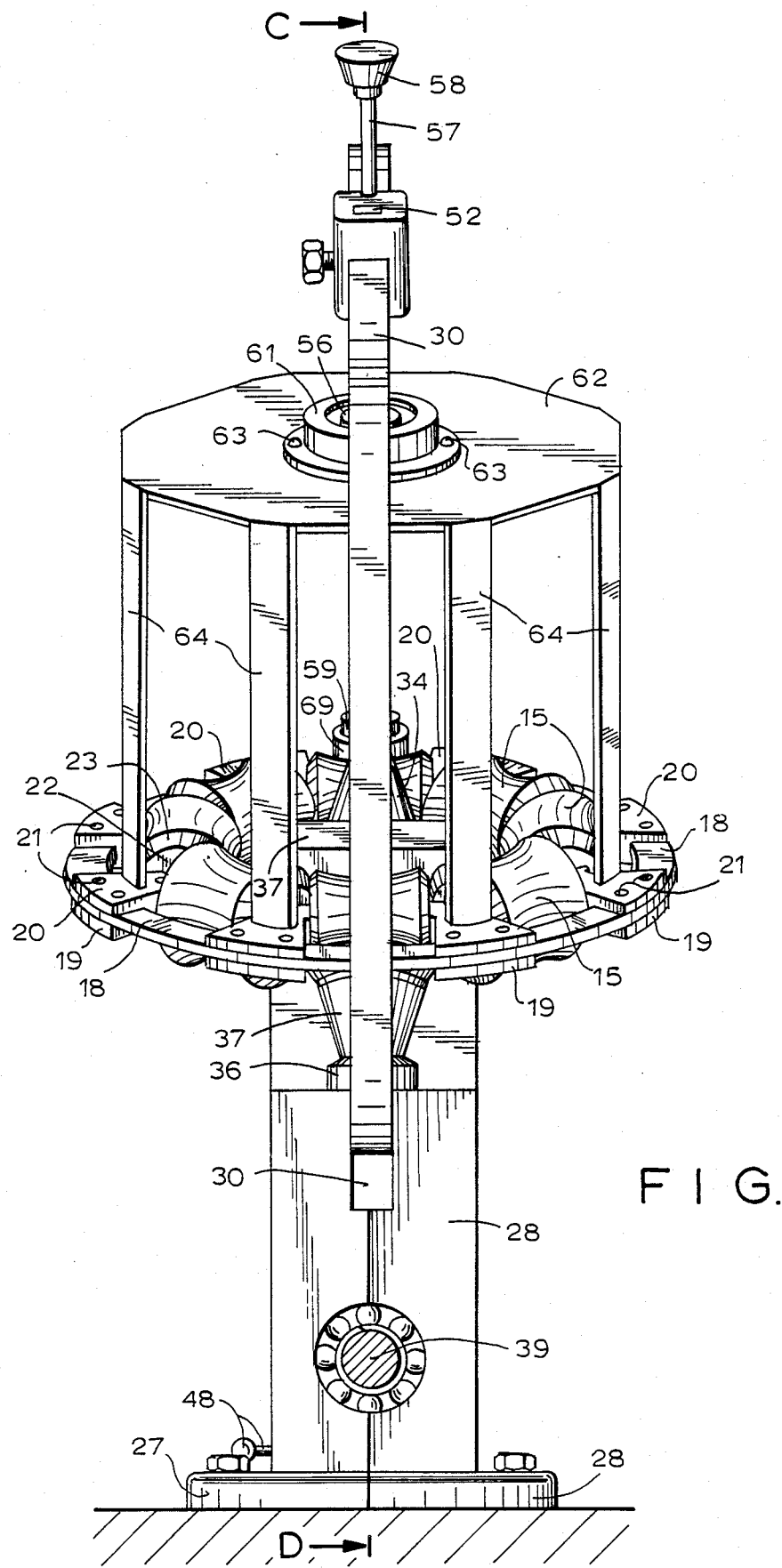
FIG. 7 is a side view of the same gearbox of the previous figure, but turned by 90° with respect to that of the previous figure.

In accordance with another characteristic of the invention, the gearbox, in its whole, is dismountable, and its framework is made by two symmetrical parts with regard to the plane of symmetry of the assembly or line C-D of FIG. 7. These parts are referenced at 27 and 28 in FIG. 7, and are connected to each other with screws 29. This structure serves as a support for the whole mechanism, fastens the relative position of all its parts and fastens the upper head 30 in which are housed the mechanisms for axial movement of the transmission crown 9 and, in consequence, serves for the effective regulation of the speed.

Figure 8:
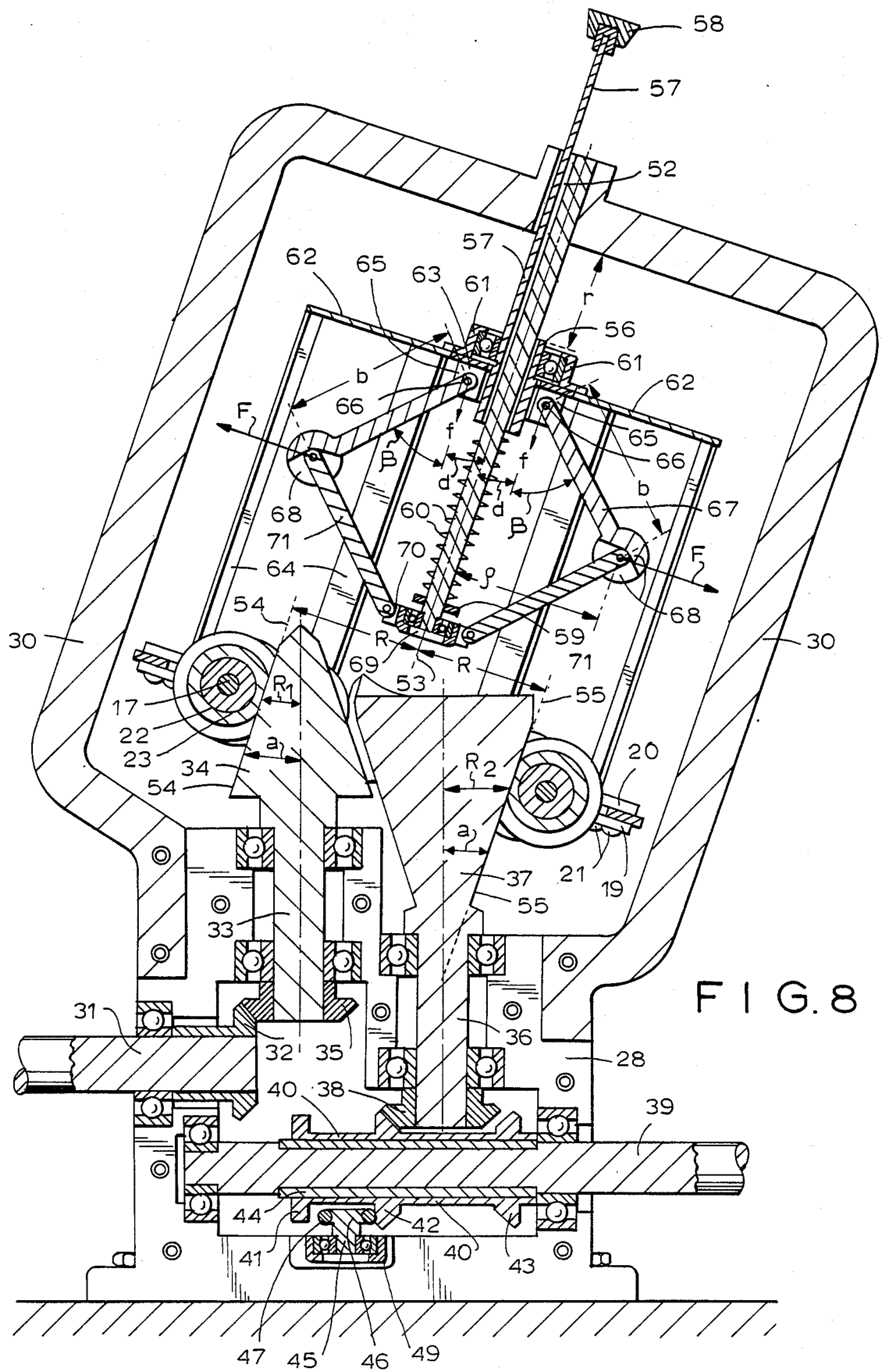
FIG. 8 is a further side view of the gearbox, similar to that of FIG. 6, but sectioned in its intermediate and symmetry planes.

The structure 27-28 houses and fastens in its inside the ball bearings, which allow the rotation of the different movable elements, such as observed in FIG. 8, namely the motor shaft 31 provided at its internal edge with the conical pinion 32, the axle 33 rigid with the actuation cone 34 and provided with the conical pinion 35, the axle 36 rigid with the driven cone 37 and provided with the conical pinion 38, and the tractor or outlet shaft 39 on which the sleeve 40 is adjustedly mounted.

This sleeve 40, which forms only one part with the flange 41, and the conical and contrapositioned pinions 42 and 43, may slide along the shaft 39, but drag in any case the latter, in the rotational sense, through the gibs 44.

In the framework formed by portions 27 and 28, the shaft 45 is also housed, rigid with the pulley 46, at which a throat on a ring 47 is made of an elastic material and adjustable. The ring 47 may be moved at will in the two senses of the direction of the shaft 39. When pushed over the greater base of the conical pinion 42 or over the smaller base of the flange 41, ring 47 forces to mesh respectively the conical pinions 42 or 43, with the conical pinion 38 associated with the shaft 36 of the driven cone 37, with which the change of gear forwards or backwards is made, respectively. This change is carried out with the aid of a small lever 48 (FIG. 6), connected to the box 49 that houses the ball bearing, which latter causes the rotation of the shaft 45 and ring 47 (see FIGS. 7 and 8).

Figure 6:
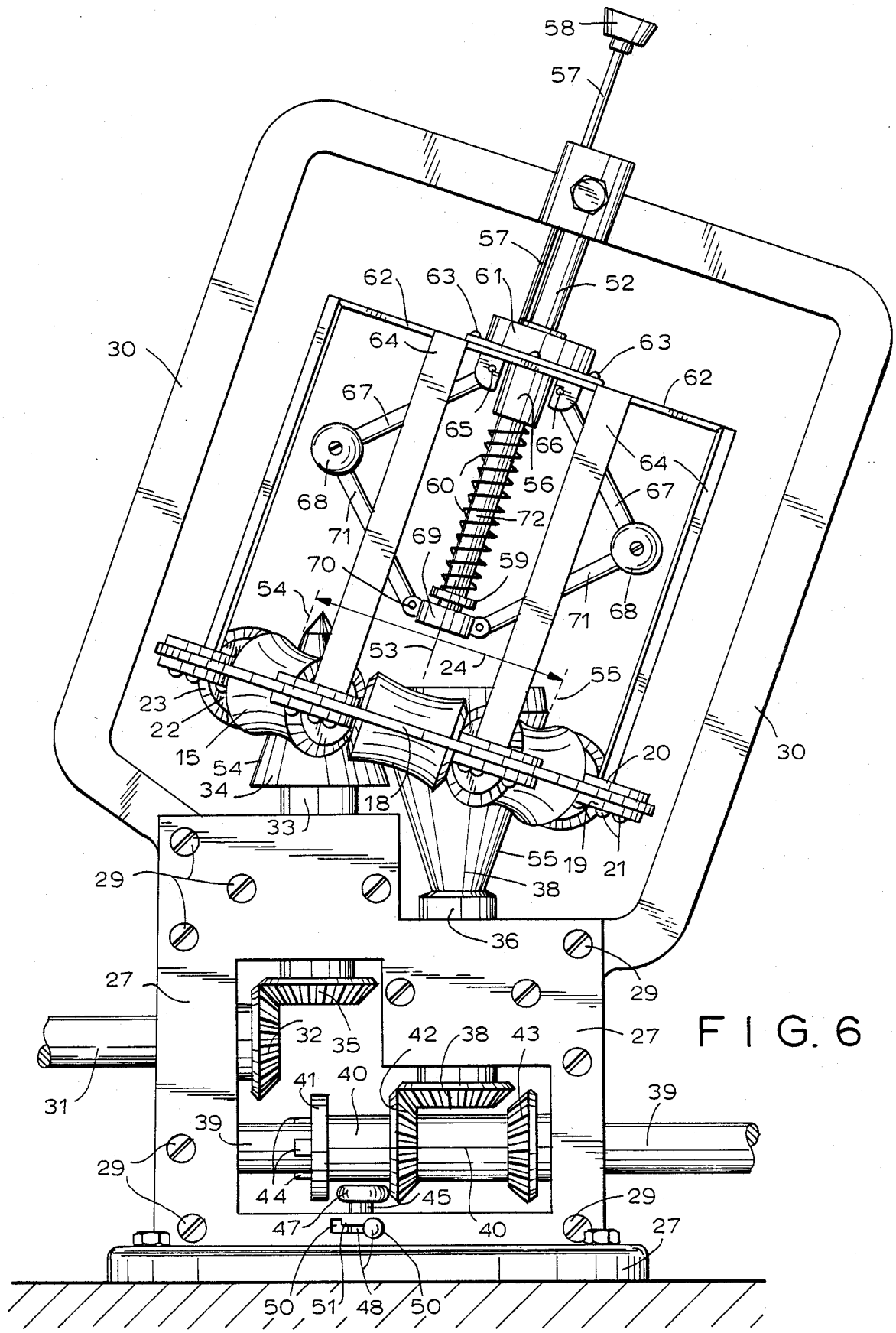
FIG. 6 is an elevational view of a gearbox of this invention.

The small lever 48, riveted into a spherical knob, may be fastened in two slots 50 and 50' made at the window 51 where the lever extends to the outside (see FIG. 6).

The upper head 30 of the framework accommodates a quadrangular rail 52 made to keep its shaft 52 parallel, coplanar and equidistant with that of the extreme generatrices 54 and 55 of the cones 34 and 37, on which the rollers 15 of the crown of transmission 9 exert pressure.

Adjustedly linked in the rail 52, is located a sleeve 56 which is bicylindrical on the outside. The axis of the sleeve 56 coincides with the axis 53, and it may slide gently along the rail 52, but, obviously, and due to the quadrangular cross-section of the latter, with no possibility of rotation.

Joined to the sleeve 56 there is a cylindrical bar 57 riveted to the corresponding knob 58 of actuation, by means of which, by actuating the same at will, the sliding of the sleeve 56 along the rail 52 can be made.

Between sleeve 56 and the flange 59 rigid to the rail 52, the helicoidal spring 60 placed in said rail 52 may be compressed, by pushing on the knob 58 in the direction of the axis 53 of the rail 52, until the sleeve 56 comes to the final stop of its travel, which establishes a limit situation for the speed change.

The cylindrical part with smaller diameter of the sleeve 56 is drawn on a ball bearing, which is in turn mounted in the box 61, which box consequently may rotate around the geometrical axis 53 of the rail 52.

The box 61 is joined to the upper face of a plate 62 by screws 63, which plate forms the cover or upper base of a rotating cage formed by a plurality of bars 64, which are made at their one edges rigid to the plate 62 and at the other edges to the plates 20 of the transmission crown 9, so that crown 9 thus forms a part of the rotating and axially moving cage.

Therefore, this cage made by the box 61, cover 62, the elongated bars 64 and the transmission crown 9, may rotate and move around and along, respectively, the rail 52.

This cage constitutes the housing of the speed regulator that makes the change of gear automatic, and for that purpose, any of those offered in the market may be used, but to complete the present description, that of Watt seems to be the most adequate one.

As shown in FIG. 8, cover 62 incorporates, rigidly connected to it at its inner face, two pairs of flaps 65 which constitute the supports for the hinges 66 of the pendular arms 67, which end at the heads 68, slotted, for the articulated link of a second set of arms. Those couples of flaps only allow the pendular rotation of the arms 67, within the plane defined by the axis 53 and the central points of the hinges 66, forcing said arms 67 to rotate around the axis 53, simultaneously with the cage, so that the angular speed of rotation of the heads 68 around the axis 53, is always the same as the angular speed of rotation of the cage.

The lower end of the rail 52 is mounted on a ball bearing, which in turn is mounted on the box 69, and is also provided with couples of flaps 70, which serve as hinges for the lower ends of the arms 71, complementary to the arms 67 and united in articulation with the heads 68.

The assembly of pendular arm 67, lower arms 71, flaps 65 and 70, box 69 and hinges, constitutes the cited Watt regulator.

Its operation is the following: when this mechanism is stopped, no action is opposed to the elastic force of the spring 60, for which the rotating cage is situated in its highest position, limited by the distance referenced with r in FIG. 8, that is, making a stop the box 61 against the upper base of the upper head 30 of the framework, and at the same time said spring 60 is positioned in a position of maximum extension and of minimum elastic tension. At the same time, the arms 67 and 71, will be under extension, and the head 68 will adopt a limit position of adaptation to the spring 60. All this assumes that the transmission crown 9 occupies the Highest position, in which it is found disconnected from the cones 34 and 37, that is, that the gearbox will be found at a "dead point".

Once the motor of the shaft 31 is started, it starts to rotate. This rotation is transmitted to the cone 34 by means of the gearing of the pinions 32 and 35, with immovable cone 37, for the crown is at "dead point" as previously mentioned.

To start the movement or the transmission, it is sufficient to push the knob 58 in the alignment of its bar 57, with which the cage advances, and the transmission crown also advances to embrace both cones 34 and 37, thus to establish the beginning of the transmission. Immediately, the crown 9 starts to rotate, as well as the cage and the Watt regulator, thus causing at the head 68 such centrifugal forces "F" which tend to an angulation between the arms 67 and 71, against the tension of the spring 60, which is compressed until a position of balance of forces is reached.

The balance is established, and in accordance with the representation of FIG. 8, the speed $W_1$ of the cone 34, which speed is the same as that of the motor shaft 31, due to the equality, in this case, of the pinions 32 and 35, it forces the crown 9 to rotate around axis 53, which, in turn, transmits the movement to the cone 37 with a speed of rotation $W_2$ the value of which is, evidently, $W_2 = W_1 R_1 / R_2$. Simultaneously, the cone 37 transmits that speed $W_2$ to the tractor shaft 39, due to the equality of the pinions 38, 42 and 43 (in this case) through the gearing of the pinion 38 with 42, in the "forward" motion, and the pinion 38 with 43 in the "backward" motion.

It is clearly deducted that if "$p_1$" is the motor torque, the tractor torque will be $p_2$ $p_1$ $R_2/R_1$.

The appearance of a resistance greater than the rotation, in the tractor shaft 39, will force it to decrease its speed $W_2$, in which case will decrease the speed of the crown, the cage and regulator, suffering therefor a decrease in the centrifugal force, which will allow the spring 60 to move the cage along the rail 52 until it is again established a balance of forces, in accordance with this new situation.

If the tractor or driven shaft 39 came to stop, the crown would also stop, the same as for the cage and the regulator, provided that the centrifugal force of the heads 68 is also reduced to zero. This would allow the spring 60 to act freely, raising the cage to the position of "dead point". That is, that when the speed is changed automatically to "dead point" this mechanism will never stop, and as the changes are made continuously and with no jumps, it will be unnecessary to use the classical clutch known in the immense majority of the gearboxes existing at present.

It is not considered as necessary to make this description more extensive so that any expert in the art understands the scope of the invention and the advantages derived from it.

The materials, shape, size and disposition of the elements are susceptible for any variation, provided it does not mean an alteration in the essentiality of the invention.

The terms under which this specification has been described must always be taken in a broad and non limitative sense.

I claim:

1. A speed gearbox, comprising:
   two contrapositioned cones having the same conical semi angle and supported by respective shafts which are parallel to each other; and
   means for transmitting a rotation from one cone to another cone, said transmitting means including a transmission crown surrounding said cones with said shafts, said crown being in shiftable contact with said two contrapositioned cones simultaneously so as to form two loci of points parallel to each other at which said contact occurs, said transmitting means having a central shaft positioned in an imaginary plane which extends through said two loci of points, said central shaft being parallel to said loci of points, said crown being rotatable about said central shaft during a transmission of rotation between said cones, said transmitting means having means for rolling on the cones, said rolling means being incorporated in said crown to facilitate a movement of said crown along said two loci points to vary relative speed of rotation of said cones.

2. The gearbox as defined in claim 1, wherein said rolling means include a plurality of rollers having a curve-concave generatrix which are positioned in a circumferencial and continuous alignment with one another, said rollers being mounted with freedom of rotation on respective shafts, said crown including an annular common support, said shafts of said rollers being rigidly connected with said annular common support, each of said rollers including a solid core which rotates freely on said respective shaft, and a housing having a great elasticity, by which said rollers are in contact with the contra-positioned cones, said rollers defining a continuous circumferential generatrix having a curvature radius which coincides with that of an imaginary circumference in which are included said two loci of points.

3. The gearbox as defined in claim 1; and further comprising
   a framework having two symmetrical parts, each of the contrapositioned cones having two ends, said shafts of said cones extending from only one of said ends and being orientated in the same sense and mounted by bearings in said framework, said two symmetrical parts fastening the bearings and defining a chamber;
   conical pinions housed in said chamber and associated to said shafts of said two cones;
   two pinions meshing with said conical pinions respectively; and
   an actuating shaft and a driving shaft each provided with one of said two pinions.

4. The gearbox as defined in claim 3 wherein said framework is extended into a hollow head, in which are housed said contrapositioned cones and the transmission crown, said crown including a cylindrical cage which is a part of said crown, said cage having a plurality of elongated bars parallel to an axle of the same, and a speed adjusting mechanism positioned inside said cage and being operative to make changes of speed, said mechanism having a guide rail fastened in said hollow head of the framework.

5. The gearbox as defined in claim 3, wherein the driven shaft incorporates a duly keyed sleeve provided with two contrapositioned pinions, and located in correspondence with the conical pinion associated to the shaft of the driven cone, said sleeve being movable axially over the driven shaft to adopt two extreme positions, said sleeve being provided with means for a manual movement between the two extreme positions.

* * * * *